United States Patent [19]
Mizuno et al.

[11] Patent Number: 5,788,999
[45] Date of Patent: Aug. 4, 1998

[54] DISK PRODUCING APPARATUS FOR A PHOTO FILM CASSETTE

[75] Inventors: Kazunori Mizuno; Akira Tomita, both of Kanagawa, Japan

[73] Assignee: Fuji Photo Film Co., Ltd., Kanagawa, Japan

[21] Appl. No.: 674,901

[22] Filed: Jul. 3, 1996

[30] Foreign Application Priority Data

Jul. 4, 1996 [JP] Japan .................... 7-168903

[51] Int. Cl.[6] ................................... B29C 17/00
[52] U.S. Cl. .................. 425/302.1; 425/384; 425/385; 425/388; 425/395; 425/403.1
[58] Field of Search ........................ 425/383, 384, 425/385, 388, 395, 403.1, 302.1

[56] References Cited

U.S. PATENT DOCUMENTS

| | | | |
|---|---|---|---|
| 4,009,981 | 3/1977 | Rosen | 425/388 |
| 4,308,005 | 12/1981 | Zundel | 425/388 |
| 4,354,816 | 10/1982 | Schepp | 425/388 |
| 4,832,275 | 5/1989 | Robertson | 242/71.1 |
| 4,834,306 | 5/1989 | Robertson | 242/71.1 |
| 5,211,348 | 5/1993 | Enomoto | 242/71.1 |
| 5,271,577 | 12/1993 | Takahashi et al. | 242/71.16 |
| 5,407,146 | 4/1995 | Takahashi et al. | 242/348 |
| 5,409,368 | 4/1995 | Heiskell et al. | 425/403.1 |
| 5,453,237 | 9/1995 | Padovani | 425/403.1 |

FOREIGN PATENT DOCUMENTS 6-67360  3/1994  Japan .................... G03C 3/00

*Primary Examiner*—Tim Heitbrink
*Attorney, Agent, or Firm*—Sughrue, Mion, Zinn, Macpeak & Seas, PLLC

[57] ABSTRACT

A photo film cassette has a spool core on which photo film (14) wound in a form of a roll. A disk (19, 20) has an axial hole (19a, 20a) formed therein, and is secured to each of ends of the spool core, for regulating ends of the roll of the photo film in the cassette. A sheet (74) of thermoplastic synthetic resin is supplied one after another. There are plural disk-like portions (65) and a positioning portion (66) formed on the sheet. A positioning pin (112) is fitted on the positioning portion of the sheet being supplied, for positioning the sheet. An upper blade group (106) includes 12 upper blades (110, 111). An lower blade group (107) includes 12 lower blades (114, 115). The upper and lower blade groups squeeze 12 of the disk-like portions while the sheet is positioned by the positioning device, for punching the axial hole and a contour of the disk, to obtain 12 disks. A vacuum pump (152) is caused by a valve (156) to suck the 12 disks on the upper blade group, to remove the 12 disks from the sheet. The vacuum pump is caused by a valve (158) to suck dust punched from the axial hole in the 12 disks through the lower blade group, to eject the punched dust. Stacker pins (103) stack the 12 disks from the upper blade group. A sheet remover (88) exits the sheet after punching plural disks.

19 Claims, 13 Drawing Sheets

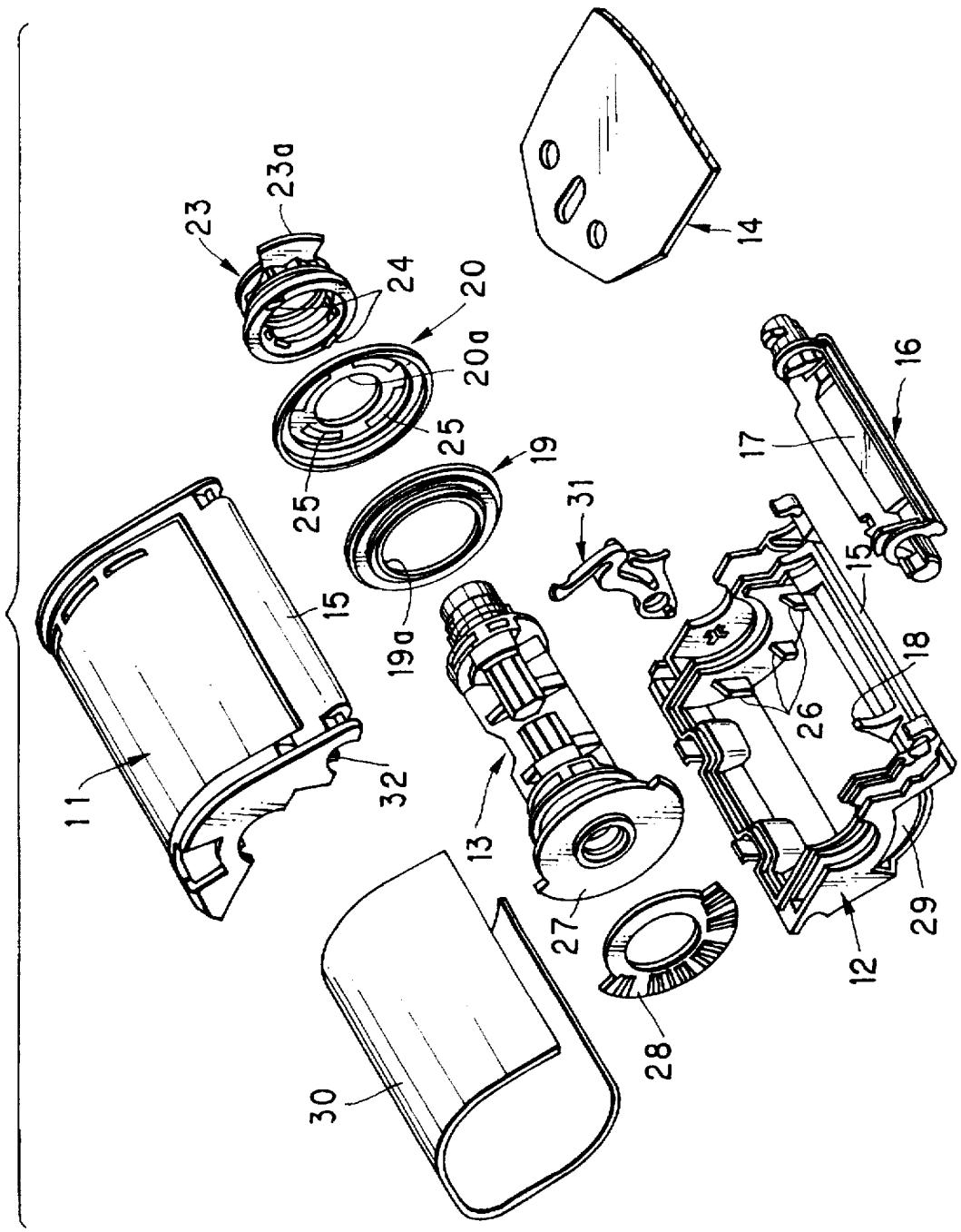

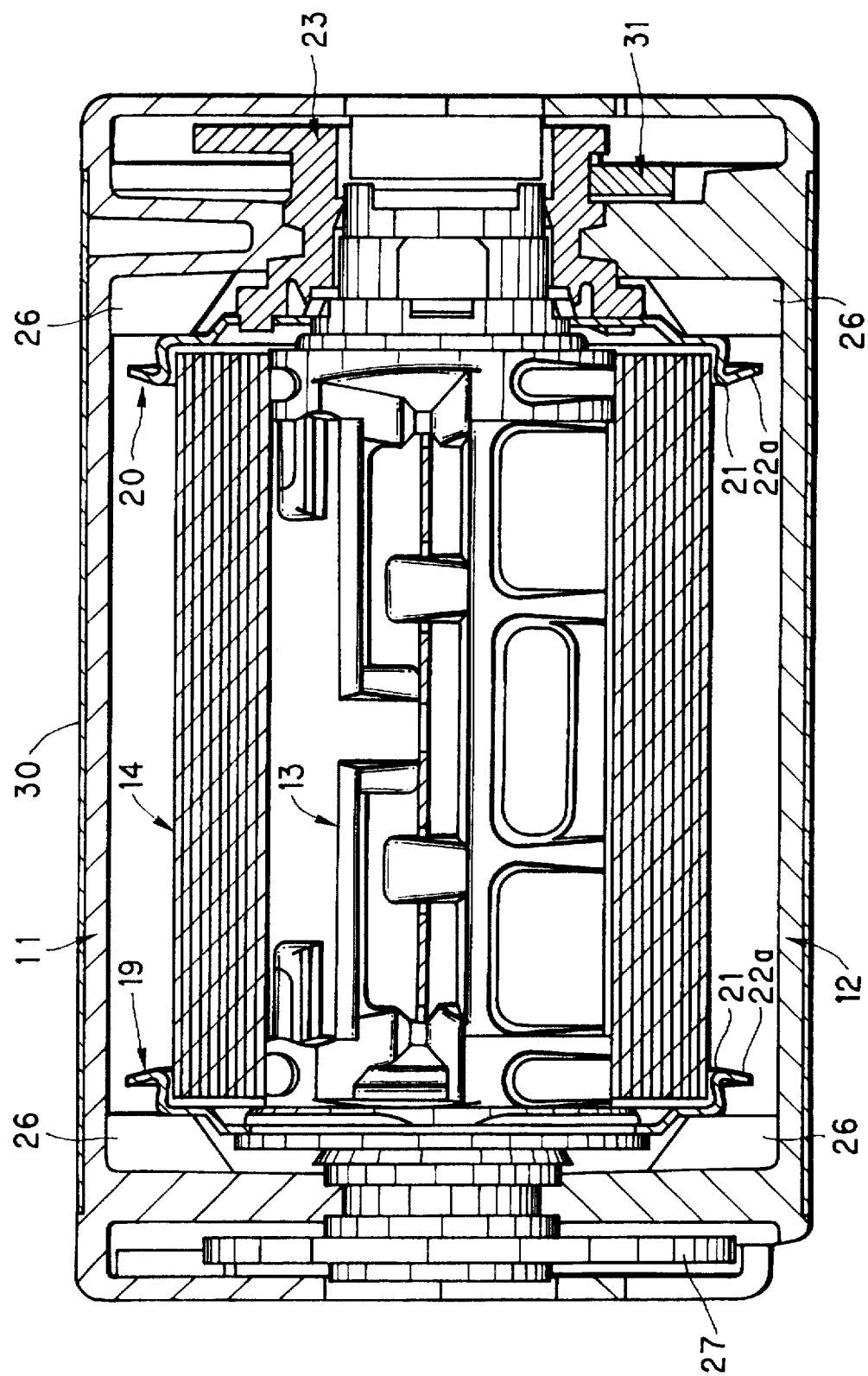

DISK PRODUCING APPARATUS FOR A PHOTO FILM CASSETTE

BACKGROUND OF THE INVENTION

1. Field of the Invention

The present invention relates to a disk producing method for a photo film cassette. More particularly, the present invention relates to a disk producing method for a photo film cassette with high precision in size.

2. Description Related to the Prior Art

There is a known photo film cassette in which a leader of photo film is pre-contained in a cassette shell, and rotation of a spool causes the leader to advance through a photo film port to the outside, as disclosed in U.S. Pat. Nos. 4,834,306 and 4,832,275, and U.S. Pat. Nos. 5,271,577 and 5,407,146 (both corresponding to JP-A 3-37645). It is necessary in the cassette to transmit rotation of the spool to a roll of the photo film. The spool has a spool core and disks secured to ends of the spool core. Each of the disks is formed in a shallow cup shape, and covers the outermost turn of the photo film at one end of the roll, to avoid loosening of the roll in the cassette, in view of reliable transmission of the rotation of the spool.

When the disks are pushed and deformed by edges of the photo film, the photo film is released from being covered by the disks. In view of easiness in the deformation, the disks are thinly formed from resilient resin or the like. There are known methods of producing disks: U.S. Pat. No. 5,211,348 (corresponding to JP-A 4-251841 and 5-119436) and JP-A 6-67360 disclose a vacuum forming method in which web of thermoplastic synthetic resin is unrolled, partially heated and softened, and heated portions are subjected to vacuum forming, air-pressure forming, or vacuum/air-pressure forming to form disk-like portions. Subsequently disks are punched out of the web at each of the disk-like portions.

In addition to the use of the web for the disk production, it is conceivable to cut the web with the disk-like portions into sheets, to stack the sheets, to take out one sheet after another, and to punch the disk-like portions. The sheet is easier to handle or position than the web. Thus the use of the sheet may be no less effective than the use of the web.

Thermoplastic synthetic resin to be used for material of the disks requires resistance to high temperature as high as 80° C., resistance to fatigue from deformation and to fatigue from flexure when formed thinly, and low surface abrasion. Examples of the resin meeting those requirements are modified polyphenylene ether (PPE) resin film, polycarbonate film, polyolefin film and the like. The thermoplastic synthetic resin of those kinds is relatively expensive. To raise a proportion of the product number to an amount of the material, disk-like portions are formed in the highly wide web in an arrangement of small intervals between them.

To raise efficiency in manufacturing disks from a sheet, the sheet should be automatically supplied. However the automated supply of the sheet is difficult because of the disk-like portions and positioning portions of the sheet.

To punch disks out of the sheet, it is efficient that an axial hole is punched at first to eject punched dust, and that the contour of the disk is punched to drop and stack a disk in the underside. However there is a shortcoming in that the disk contour is likely to eccentric from the axial hole. It would be conceivable to punch the axial hole and the contour at the same time. However it would be difficult to separate disks from punched dust after the punching from the sheet. A problem lies in instability in removal of the disks having the small thickness.

To lower the cost of the disk, it would be conceivable to raise the number of disks punched at one time, in view of higher efficiency. Two blade groups respectively including plural blades may be used. To punch a sheet having a heightened proportion of the product number to an amount of the material, the blade groups should have a pitch at which the blades are arranged. However supports of the blades must be sufficiently rigid for the purpose of facilitating renewal of blades and keeping sufficient precision. It would be likely that the supports are larger than the blade groups. The minimum of the pitch of the blades is determined according to the size of the supports. There is an inevitable lower limit of setting the pitch of the blades.

Disks having been punched are conveyed to next station for mounting on spool cores. If the orientation of the disks being supplied is irregular, efficiency in the spool core mounting is low.

SUMMARY OF THE INVENTION

In view of the foregoing problems, an object of the present invention is to provide a disk producing method for a photo film cassette with precision and at a low cost.

In order to achieve the above and other objects and advantages of this invention, a punching station is supplied with a sheet of thermoplastic synthetic resin one after another, there being plural disk-like portions and a positioning portion formed on the sheet. The sheet set in the punching station is positioned by fitting a positioning device on the positioning portion of the sheet. N of the disk-like portions are squeezed between upper and lower blade groups while the sheet is positioned by the positioning device, for punching the axial hole and a contour of the disk, to obtain N disks, the upper blade group including N upper blades, and the lower blade group including N lower blades. The N disks are sucked on the upper blade group, to remove the N disks from the sheet. Dust punched from the axial hole in the N disks is sucked through the lower blade group, to eject the punched dust. The N disks from the upper blade group are stacked. The sheet is exited after punching plural disks which comprise the N disks.

In a preferred embodiment, the sheet supplying step includes sucking an uppermost one of plural sheets being stacked. The uppermost sheet being sucked is conveyed between the upper and lower blade groups.

Further, the N disks are conveyed from the upper blade group to N stacker pins. The axial hole of the N disks is received respectively in the N stacker pins, to stack the N disks.

BRIEF DESCRIPTION OF THE DRAWINGS

The above objects and advantages of the present invention will become more apparent from the following detailed description when read in connection with the accompanying drawings, in which:

FIG. 1 is an exploded perspective illustrating a photo film cassette;

FIG. 2 is a cross section illustrating the photo film cassette;

DETAILED DESCRIPTION OF THE PREFERRED EMBODIMENT(S) OF THE PRESENT INVENTION

Figure 3A:
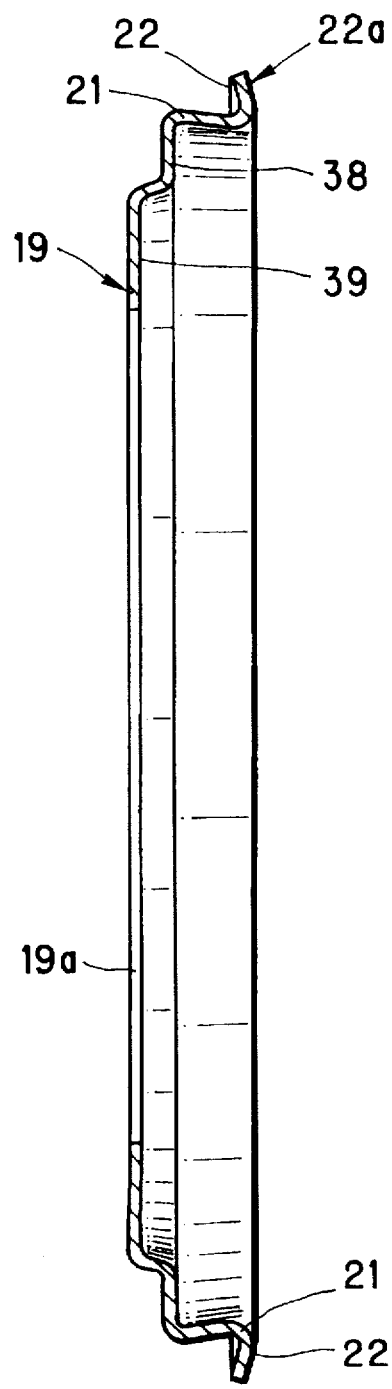
FIGS. 3A and 3B are cross sections illustrating respective disks of first and second types.

In FIG. 1, a cassette shell includes upper and lower shell halves 11 and 12 respectively formed from plastic. A spool core 13 is contained in the cassette shell in rotatable fashion, and has photo film 14 wound in a roll form.

The shell halves 11 and 12 respectively have a semi-cylindrical shape. There is a photo film port 15 defined between tongues extended from the shell halves 11 and 12. When the shell halves 11 and 12 are fitted together, a photo film port shutter 16 is rotatably contained in the photo film port 15. A photo film passageway 17 is formed as a gap in the photo film port shutter 16. When the photo film port shutter 16 rotates to an open position, the photo film passageway 17 communicates from the inside of the photo film port 15 to the outside, to allow the photo film 14 to pass. When the photo film port shutter 16 rotates to a closed position, the photo film port 15 is completely closed, to shield the inside of the cassette shell 10 from ambient light.

A separator claw 18 is formed in the position inward from the photo film port 15 of the lower shell half 12. The separator claw 18, when the spool core 13 is rotated, abuts on a leader of the photo film 14, separates the leader from the roll, and guides it to the photo film passageway 17.

Disks 19 and 20 have respective axial holes 19a and 20a. The spool core 13 is inserted through the axial holes 19a and 20a to secure the disks 19 and 20 to on the spool core 13 in rotatable fashion in their positions. There are formed ring-like lips 21 on the periphery of 19 and 20 to project toward each other. The ring-like lips 21 partially cover edges of the outermost turn of the photo film 14.

When a barrel member 23 is fitted on the spool core 13, retaining holes 25 in the disk 20 are retainable on the clutch claws 24. In rotation of the spool core 13 in the unwinding direction, the retaining holes 25 are retained by the clutch claws 24 to transmit rotation to the disk 20. When the spool core 13 is rotated in the winding direction, the retaining holes 25 are not retained by the clutch claws 24, so that the disk 20 is rotationally free from the spool core 13. On the other hand, the disk 19 is always rotatable about the spool core 13. There is a sector plate 23a formed with the barrel member 23. A position of the sector plate 23a is visible through one of indicator windows. A used status of the photo film cassette is indicated through the one window.

Ridges 26 are projected from an inside of the shell halves 11 and 12, and prevent the disks 19 and 20 from spreading. A sector plate 27 is fixed on the spool core 13, and has a data bar code sticker 28 attached thereto. There is a bar code printed on the data bar code sticker 28 and arranged radially. The bar code is photoelectrically detected through a window 29 in the cassette shell 10 when the spool core 13 is rotated. It is possible to read information of a type the photo film 14 contained in the cassette shell 10 and information of the number of frames of the photo film 14. A sticker 30 attached to the cassette shell 10 has indication of the photo film type information and an identifying information of the cassette. It is also possible to provide the sector plate 27 directly with a bar code according to hot stamping without using the data bar code sticker 28.

A spool lock 31 blocks rotation of the spool core 13 while the photo film port shutter 16 has the closed position. When the photo film port shutter 16 is rotated to the open position, the spool core 13 is unblocked. Reference numeral 32 designates a lock pawl formed integrally with the upper shell half 11. The photo film port shutter 16 is locked by the lock pawl 32 when rotated to the closed position. A camera or a display device adapted with the photo film cassette includes an opener mechanism, which unlock the lock pawl 32 to open the photo film port shutter 16 when the camera or display device is loaded with the photo film cassette. Note that it is possible to form a photo film passageway in the photo film port 15, and to attach plush or light-trap fabric instead of the use of the photo film port shutter 16, for the purpose of shielding ambient light from the cassette shell 10.

As illustrated in FIG. 2, when the photo film 14 is completely contained in the cassette shell 10, the outermost turn of the photo film 14 is partially covered in the ring-like lips 21 of the disks 19 and 20, and prevented from being loosened about the spool core 13. When the spool core 13 is rotated in the unwinding direction of the photo film 14, the photo film 14 rotates integrally with the spool core 13.

The ridges 26 inside the shell halves 11 and 12 regulate movable ranges of the disks 19 and 20. In the position inward from the photo film port 15, an interval between confronted two of the ridges 26 is enlarged, locally to release the disks 19 and 20 for being spread. After the leader of the photo film 14 is separated by the separator claw 18 toward the photo film passageway 17, the disks 19 and 20 are spread outwards. The photo film 14 is advanced from between the ring-like lips 21 in curled fashion like an archway.

Note that it is possible to eliminate a half of the ridges 26 on one end face of the cassette, while using the remaining half of the ridges 26. There are other alternative structures to releasing prevention of looseness of the photo film: a pair of separator claws are formed on both sides with reference to the width direction of the photo film. Lateral faces of the separator claws can keep the lips partially deformed in a direction away from one another.

When a camera is loaded with the photo film cassette, the camera releases the photo film port shutter 16 from the retention of the lock pawl 32, and rotates the photo film port shutter 16 to the open position. Then the spool core 13 is rotated in the unwinding direction, to start advancing the photo film 14. As the ring-like lips 21 of the disks 19 and 20 are avoiding loosening the photo film 14, the roll of the photo film 14 rotates integrally with the spool core 13. The leader of the photo film 14 is separated by the separator claw 18, and directed to the photo film passageway 17.

While the leader of the photo film 14 is passed through the photo film passageway 17, the photo film 14 spreads the ring-like lips 21 outwards, so that the photo film 14 is released from being covered in the ring-like lips 21 in the position inward from the photo film passageway 17. The disk 20 is forcibly rotated in the unwinding direction in engagement of the clutch claws 24 with the retaining holes 25, and thus raises force to advance the photo film 14. This being so, rotation of the spool core 13 causes the photo film 14 to advance to the outside of the cassette shell 10.

In the photo film rewinding, the spool core 13 is rotated in reverse. As the trailer of the photo film 14 is retained on the spool core 13, the photo film 14 is wound back into the cassette shell 10 by the rotation of the spool core 13. In a position inward from the photo film passageway 17, the disks 19 and 20 are spread, between which the photo film 14 is taken up and wound about the spool core 13.

Figure 3B:
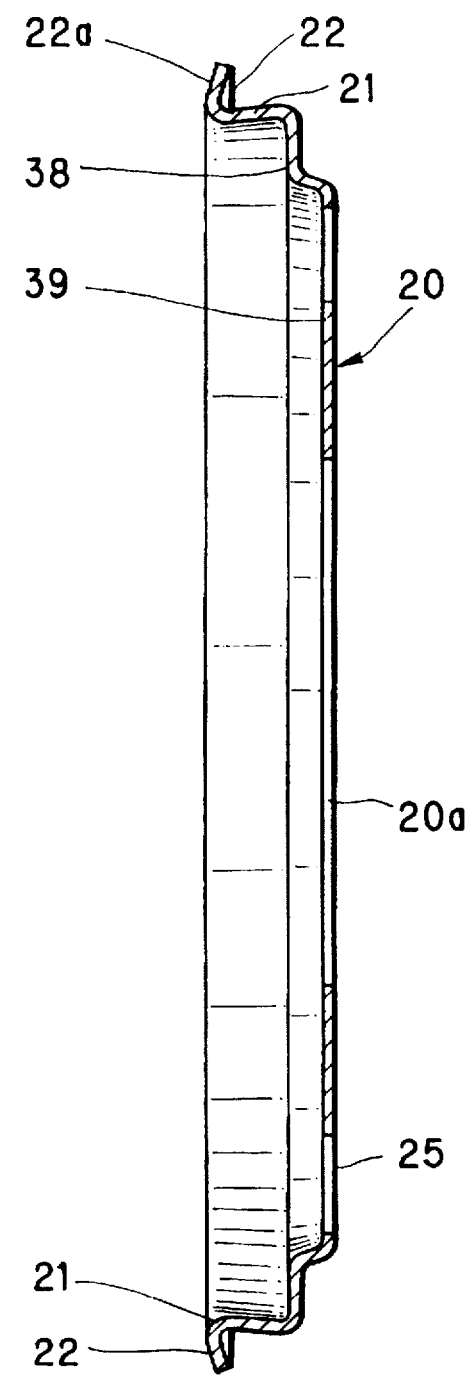

The disk 19 in FIG. 3A has a contour the same as the disk 20 in FIG. 3B. The axial holes 19a and 20a are formed respectively in a central wall 39, which is stepped from an intermediate wall 38. The intermediate wall 38 is contacted on each end face of the roll of the photo film 14, unlike the central wall 39 which is away from the photo film 14. Each of the ring-like lips 21 is projected from the periphery of the intermediate wall 38, to cover the outermost turn of the photo film 14 partially about the spool core 13.

The periphery of each of the ring-like lips 21 has a ring-like projection 22, which reinforces the ring-like lips 21 and resistant to spreading of the ring-like lips 21. Also the ring-like projection 22 has a face 22a inclined in a direction away from the opposite disk. In winding the photo film 14, the inclined face 22a guides the photo film 14 toward a cylindrical space defined inside the ring-like lips 21.

Figure 4:
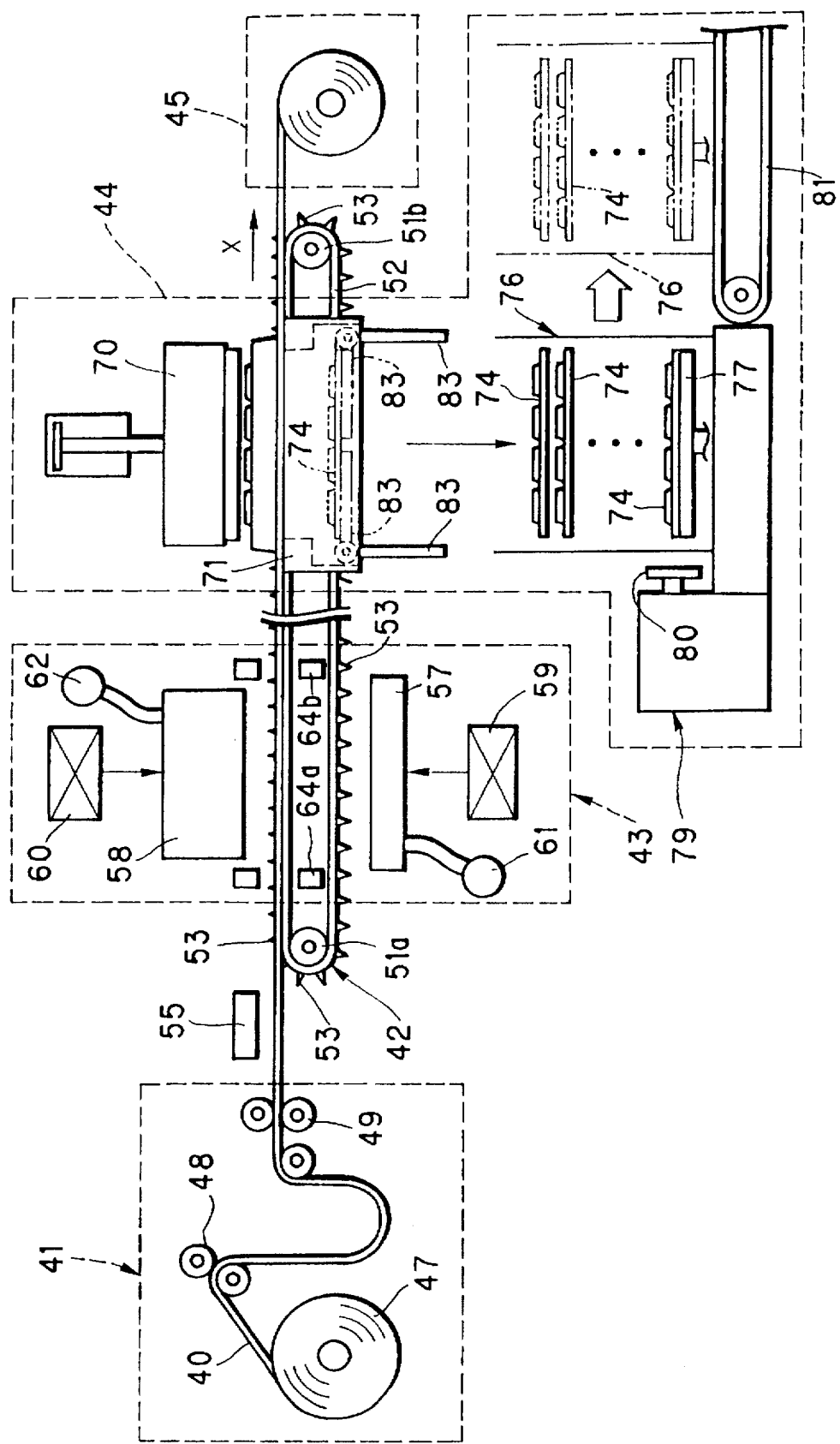
FIG. 4 is an explanatory view illustrating an apparatus for producing sheets.

FIG. 4 illustrates an apparatus for producing the sheet from which the disks 19 and 20 are obtained. The apparatus works web 40 of thermoplastic synthetic resin as material of the disks 19 and 20, and includes a web supplier 41, a web conveyor 42, a heating/forming unit 43, a web/sheet cutter device 44 and a web winder 45.

The web 40 is formed of resin of polystyrene-modified polyphenylene ether with elastomer added thereto. The ratio of polystyrene and polyphenylene ether is 3:7. The proportion of elastomer is 12 wt. %. Silicone and/or antistatic agent is added to the resin when desired. It is also possible that the web 40 is polycarbonate film, polyethylene film or the like. The web 40 has a thickness of 0.15 mm±30%, preferably 0.15 mm±20%, and desirably 0.15 mm±10%. The web 40 has a width of 200–300 mm.

The web supplier 41 includes a web roll 47, a loop control device 48 and conveyor rollers 49. The web 40 is drawn from the web roll 47 by the loop control device 48 as much as a predetermined length. The conveyor rollers 49 convey the web 40 toward the web conveyor 42. A spare web roll (not shown) is contained in the web supplier 41. As soon as the web 40 from the web roll 47 is used up, the spare web roll is loaded, to supply the web 40 without interruption.

The web conveyor 42 includes two chains 52 and a number of pointed portions 53. Each of the chains 52 is supported rotatably about a driving sprocket wheel 51a and a driven sprocket wheel 51b. Each of the pointed portions 53 is formed to project from one of links connected to constitute the chains 52. The pointed portions 53 have a tip sharp enough for penetration. When the web 40 is supplied from the web supplier 41, the pointed portions 53 serially penetrate an edge portion of the web 40. Movement of the chains 52 conveys the web 40 in the arrow direction X in intermittent fashion at a regular length. The chains 52 are respectively disposed under edges of the web 40, to support and convey the web 40. The chains 52 are constructed in accordance with JP-U 61-176136, in which the web having the small thickness can be reliably pierced by the pointed portions 53 of the chains 52, no chip is created from the web in piercing the web, and also the web can be kept flat without undulation when pierced.

For the pointed portions 53 smoothly to pierce the web 40, a ceramic heater 55 is disposed upstream from the web conveyor 42 for heating edges of the web 40. The ceramic heater 55 heats edge portions of the web 40 in a range of 3–15 mm from each side of the web 40, as the edge portions are not subjected to the forming in the heating/forming unit 43. The web 40 is softened by the ceramic heater 55 at the temperature of 50°–120° C., preferably 70°–110° C., and desirably 80°–100° C. If the web 40 has a great thermal expansibility, it is preferable to preheat the web 40 before the heating/forming unit 43, and expand the web 40 before the vacuum/air-pressure forming, so as to prevent occurrence of wrinkles on the web 40.

The web 40 supported on the web conveyor 42 is conveyed along the chains 52 to the heating/forming unit 43. The heating/forming unit 43 includes a hot plate or heating plate 57 under the web 40 and a female mold 58 over the web 40. A shifter mechanism 59 is associated with the heating plate 57. There are a vacuum pump (not shown) and a compressor (not shown) associated with the heating plate 57 via a cross valve 61. The shifter mechanism 59 shifts the heating plate 57 up and down. The vacuum pump as air sucker effects air suction of the web 40 through the heating plate 57. The compressor as air pressurizer effects air pressurization to the web 40 through the heating plate 57. There is a shifter mechanism 60 associated with the female mold 58. The vacuum pump and the compressor are also associated with the female mold 58 via a cross valve 62. The shifter mechanism 60 is similar to the shifter mechanism 59.

The heating plate 57 is raised toward the web 40 at the same time as the female mold 58 is lowered toward the web 40. For both of the heating plate 57 and the female mold 58, the web 40 is referred to as a reference plane. The web 40 is squeezed between them before the heating and the vacuum/air-pressure forming. The female mold 58 includes a plurality of disk producing cavities respectively for shaping the contour of the disks 19 and 20. The heating plate 57 incorporates a plurality of cartridge heaters for heating a surface of the heating plate 57 in uniform fashion. To control the temperature, it is preferable to use the control method disclosed in JP-A 4-176632 for heating the surface in stable and uniform fashion. The shifter mechanisms 59 and 60 respectively include a servo motor to cause the heating plate 57 and the female mold 58 to move with precision. It is also possible instead to use an air cylinder, a hydraulic cylinder, a solenoid, a cam or the like while taking it in consideration to keeping precision in movement.

Figure 5:
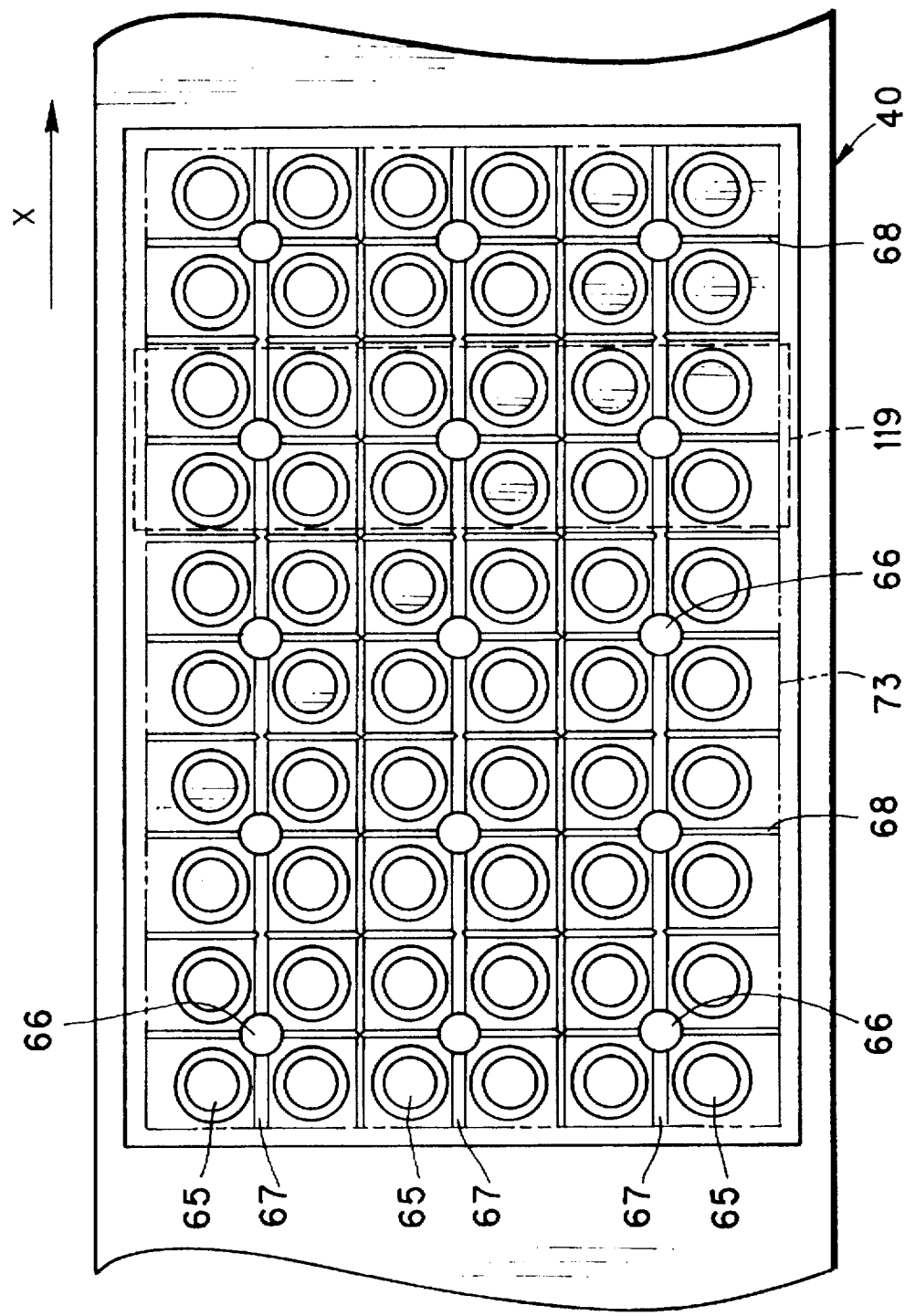
FIG. 5 is a plan illustrating web after one-shot operation of the vacuum/air-pressure forming.

When the heating plate 57 and the female mold 58 squeeze the web 40, the vacuum pump sucks the web 40 through the heating plate 57 and the cross valve 61. The heating plate 57 is fully contacted on the web 40, and heats and softens it in uniform fashion. After the softening the web 40, the vacuum pump sucks the web 40 through the female mold 58 and the cross valve 62. The compressor pressurizes the web 40 through the heating plate 57 and the cross valve 61. The web 40 is tightly fitted on the female mold 58. When one shot of operation of the forming is effected, 60 disk-like portions 65 are formed on the web 40. The disk-like portions 65 include 10 as viewed in the arrow direction X and six (6) as viewed transverse to the arrow direction X as illustrated in FIG. 5.

There are clampers/coolers 64a and 64b disposed upstream and downstream from the heating plate 57, the female mold 58. The clampers/coolers 64a and 64b squeeze the web 40 in fixed fashion, and avoid occurrence of wrinkles on the web 40 pulled into the position between the heating plate 57 and the female mold 58. The clampers/coolers 64a and 64b respectively include passageways through which cooling water flows, and cool down squeezed portions of the web 40. This is effective in preventing heat of the heating plate 57 from application to the unheated portions of the web 40. The double application of heat to the web 40 is avoided.

On the web 40 are formed circular positioning portions 66, which are positioned when the disk-like portions 65 are punched. On the web 40 are formed guide ridges 67, which guide movement of the web 40 before punching the disk-like portions 65. There are also formed reinforcer ridges 68 for reinforcement of the web 40.

Figure 6A:
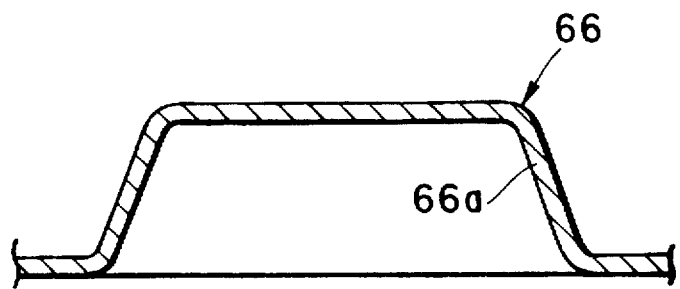
FIGS. 6A, 6B and 6C are cross sections respectively illustrating a positioning portion, a guide ridge and a reinforcer ridge.

The positioning portions 66 have an upset cup shape as viewed in cross section of FIG. 6A, and has an inclined face 66a. To punch the disk-like portions 65, lower positioning pins are respectively inserted up into the positioning portions 66. The lower positioning pins have inclination, and are fitted on the inclined face 66a for reliable positioning of the web 40. Also, upper positioning pins having bottom recesses respectively come down to the positioning portions 66 to receive their insertion. The upper positioning pins have inclination in the bottom recesses, and are fitted on a reverse of the inclined face 66a. The positioning portions 66 are arranged every two rows and every two columns of the disk-like portions 65. In other words, the positioning portions 66 are arranged in a matrix of 3×5, and are 15 formed at one time.

Figure 6B:
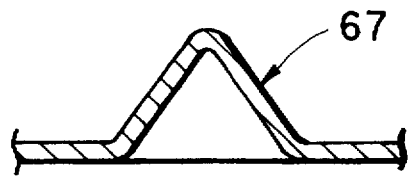
Figure 6C:
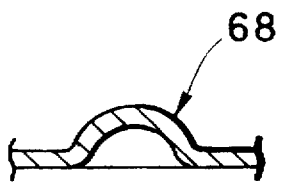

The guide ridges 67 have an upset V-shape as viewed in cross section of FIG. 6B, and guides the sheet from the web 40 when a bottom of the guide ridges 67 is fitted in a ridge which is formed on a punch for punching away the disk-like portions 65 from the sheet from the web 40. The three guide ridges 67 are arranged in the arrow direction X and aligned with the positioning portions 66. The reinforcer ridges 68 have an arc shape as viewed in cross section of FIG. 6C, and reinforce the sheet cut from the web 40 after the one-shot forming. The reinforcer ridges 68 are disposed between the disk-like portions 65 in grating fashion. The guide ridges 67 are parallel to the arrow direction X in FIG. 5, but may be formed transverse to the direction X. A sheet with the variant guide ridges can be conveyed or supplied in the direction of the variant guide ridges. Although the variant guide ridges render productivity lower than the guide ridges 67 above, the variant guide ridges are effective in raising releasability of the female mold 58.

The web 40 after the forming in the heating/forming unit 43 is conveyed to the web/sheet cutter device 44. As illustrated in FIG. 4, the web/sheet cutter device 44 includes an upper punch 70 above the web 40 and a lower die 71 under the web 40. The upper punch 70 is lowered toward the web 40 stopped in conveyance on the web conveyor 42. The upper punch 70 and the lower die 71 squeeze the web 40. Lines of cutting of the upper punch 70 and the lower die 71 are indicated by phantom lines 73 in FIG. 5. Wrinkled portions in direct contact on the heating plate 57 and the female mold 58 are located outside the phantom lines 73, and cut away by the web/sheet cutter device 44, to obtain a sheet 74 having a plurality of disk-like portions 65. The web 40 after cutting the sheet 74 is wound by the web winder 45, and reused later by remelting and recycling. An example of recycling method is to extrude a continuous sheet in lamination of three layers including a bottom layer of the remelted resin, a middle layer of unused resin, and a top layer of the remelted resin.

The sheet 74 cut from the web 40 is separated from the web 40 by a knockout device incorporated in the upper punch 70, and dropped down through the lower die 71. A sheet stacking container 76 is disposed under the lower die 71 for stacking a plurality of sheets 74 overlaid on one another. In the sheet stacking container 76 is disposed a movable bottom plate 77 movable up and down. Note that it is possible to eliminate the sheet stacking container 76, and to use the movable plate 77 simply for stacking the sheet 74.

The movable plate 77, when receiving the sheet 74 at first, is located in its uppermost position inside the sheet stacking container 76, to minimize the distance to the lower die 71. This prevents the sheet 74 from changing its orientation while dropped from the lower die 71. In the sheet stacking container 76 is disposed a sensor for monitoring the stacked height of the sheets 74. An output of the sensor is evaluated, to control the movable plate 77 to move down in the sheet stacking container 76 gradually according thereto. The distance between the lower die 71 and the uppermost one of the sheets 74 is kept unchanged. When the sheets 74 in the sheet stacking container 76 are removed one after another to decrease in number, the movable plate 77 is controlled to move up gradually according to the sensor output.

The sheet stacking container 76 is placed on a container shifter 79. When the sheet stacking container 76 comes to contain a predetermined number of sheets 74, the container shifter 79 thrusts a slider 80 rightwards in the drawing, to shift the sheet stacking container 76 to an upside of a sheet conveyor 81. The sheet conveyor 81 includes a conveyor belt, and conveys the sheet stacking container 76 to a station where the disks 19 and 20 are punched from the sheet 74.

Under the lower die 71 is disposed a shutter device for provisionally retaining the sheet 74 while the container shifter 79 transfers the sheet stacking container 76 toward the sheet conveyor 81. The shutter device is constituted of a pair of shutter plates 83 swung to open/close the bottom of the cavity in the lower die 71. When the sheet stacking container 76 is moved away from the container shifter 79 to wait for another container to be placed on the container shifter 79, the sheet 74 is retained by the shutter plates 83 provisionally as indicated by the phantom line. When next container is placed on the container shifter 79, the shutter plates 83 are opened to cause the sheet 74 to drop down to the sheet stacking container 76.

Figure 7:
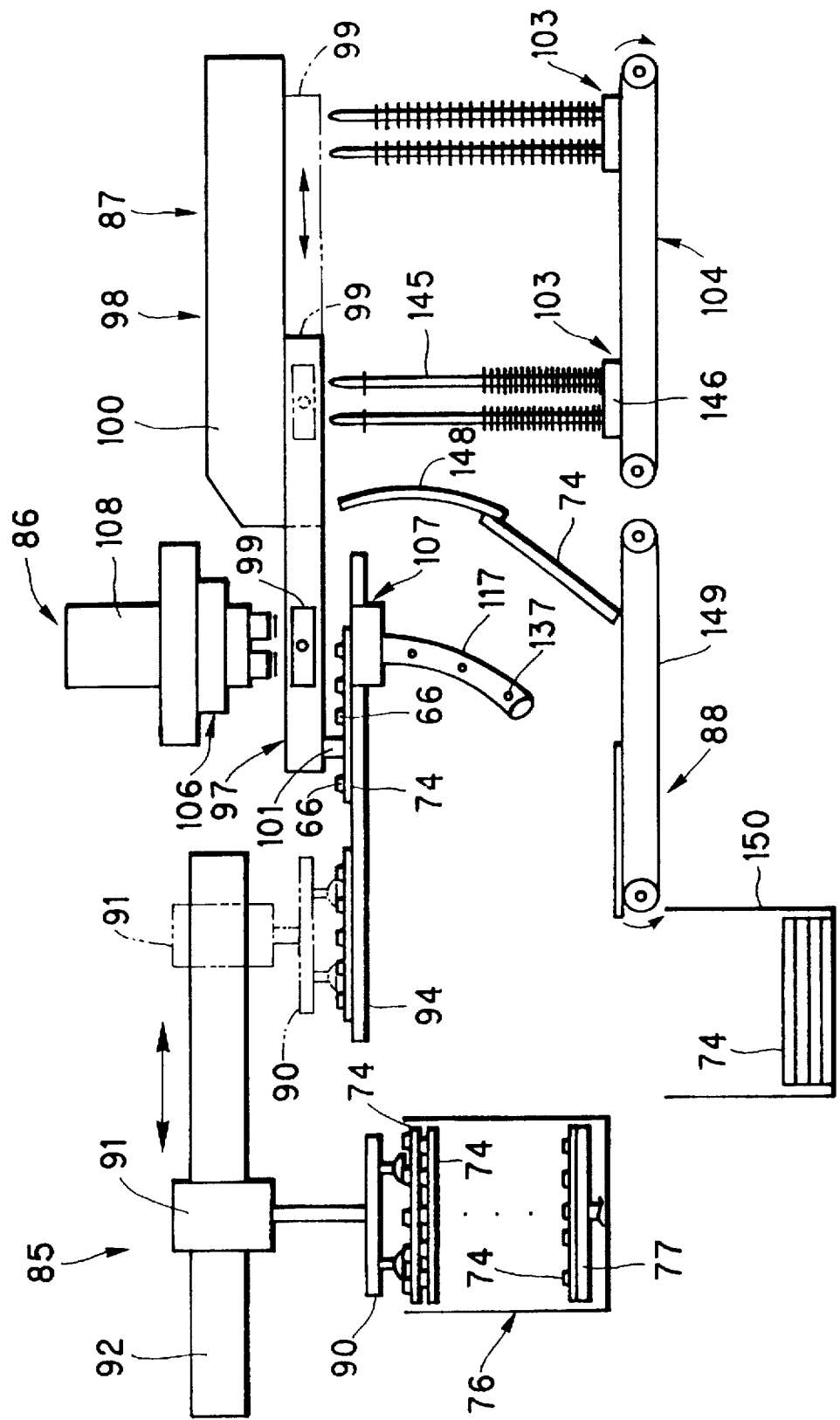
FIG. 7 is an explanatory view illustrating a disk producing apparatus.

The sheet stacking container 76 conveyed from the sheet producing apparatus is fed to a disk producing apparatus of the present invention. In FIG. 7, the disk producing apparatus includes a sheet supply device 85, a punching unit 86, a disk stacker 87 and a sheet remover 88. The sheet supply device 85 takes out the sheet 74 from the sheet stacking container 76 thereunder and feeds the sheet 74. The punching unit 86 punches plural disks from the sheet 74 supplied from the sheet supply device 85. The disk stacker 87 stacks the disks 19 and 20 cut from the sheet 74. The sheet remover 88 exits the sheet 74 after punching the disks 19 and 20.

The sheet supply device 85 takes out an uppermost one of the sheets 74 stacked in the sheet stacking container 76, and includes a sheet sucker 90 and a sheet conveyor 91. The sheet sucker 90 effects air suction of the sheet 74. The sheet conveyor 91 moves the sheet sucker 90 in vertical and horizontal directions. The sheet conveyor 91 is mounted on a guide rail 92 on which the sheet conveyor 91 is slidable in the horizontal direction. The sheet conveyor 91 incorporates an air cylinder, and moves the sheet sucker 90 up and down. Also the sheet conveyor 91 incorporates a motor, which causes the sheet conveyor 91 to slide along the guide rail 92, horizontally to move the sheet sucker 90.

The sheet stacking container 76 incorporates a sensor, which monitors the number of remaining ones of the sheets 74. According to a decrease of the sheets 74, the bottom plate 77 is gradually raised, to keep unchanged the height of the uppermost one of the sheets 74. It follows that a vertically moved amount of the sheet sucker 90 is unchanged.

The sheet 74 raised from the sheet stacking container 76 by the sheet supply device 85 is placed on a guide plate 94 and positioned in the width direction of the sheet 74. The sheet 74 is directed such that its shorter side as shown in FIG. 5 is advanced to the right in FIG. 7. There are three guide ridges 95 formed on the upper face of the guide plate 94, as illustrated in FIG. 10, to receive insertion of recesses in the rear of the guide ridges 67 in the sheet 74. The guide ridges 95 position the sheet 74 in provisional fashion in the width direction of the sheet 74. The sheet 74 is conveyed to the right intermittently at a pitch of each of intervals between the positioning portions 66 with reference to the lengthwise direction of the sheet 74.

The sheet 74 is conveyed on the guide plate 94 at the same time as the disks 19 and 20 are conveyed in the disk stacker 87. The disk stacker 87 includes a disk receiver 97, a disk conveyor 98 and a stacker conveyor 104. The disk receiver 97 receives the disks 19 and 20 from the punching unit 86. The disk conveyor 98 moves the disk receiver 97 to a disk stacker 103. The stacker conveyor 104 conveys the disk stacker 103 and the disks 19 and 20 to a station of a posterior process.

The disk conveyor 98 includes a disk support 99 and a shifter mechanism 100. The disk support 99 incorporates the disk receiver 97, and is horizontally moved between positions inside and outside the punching unit 86. The shifter mechanism 100 shifts the disk support 99 horizontally. The disk support 99 has a pitch feeding guide or retainer 101, which is movable vertically up and down, and moved down to retain the tops of the positioning portions 66 on the sheet 74. While the retainer 101 retains the positioning portions 66, the disk support 99 is moved to the right by the shifter mechanism 100, to convey the sheet 74 intermittently.

The punching unit 86 has upper and lower blade groups 106 and 107 located higher and lower than the sheet 74. The upper blade group 106 is lowered by a drive unit 108 including a cam, a hydraulic cylinder or the like, and squeezes the sheet 74 between it and the lower blade group 107, to punch the axial hole and the contour of the disk-like portions 65 on the sheet 74.

Figure 7A:
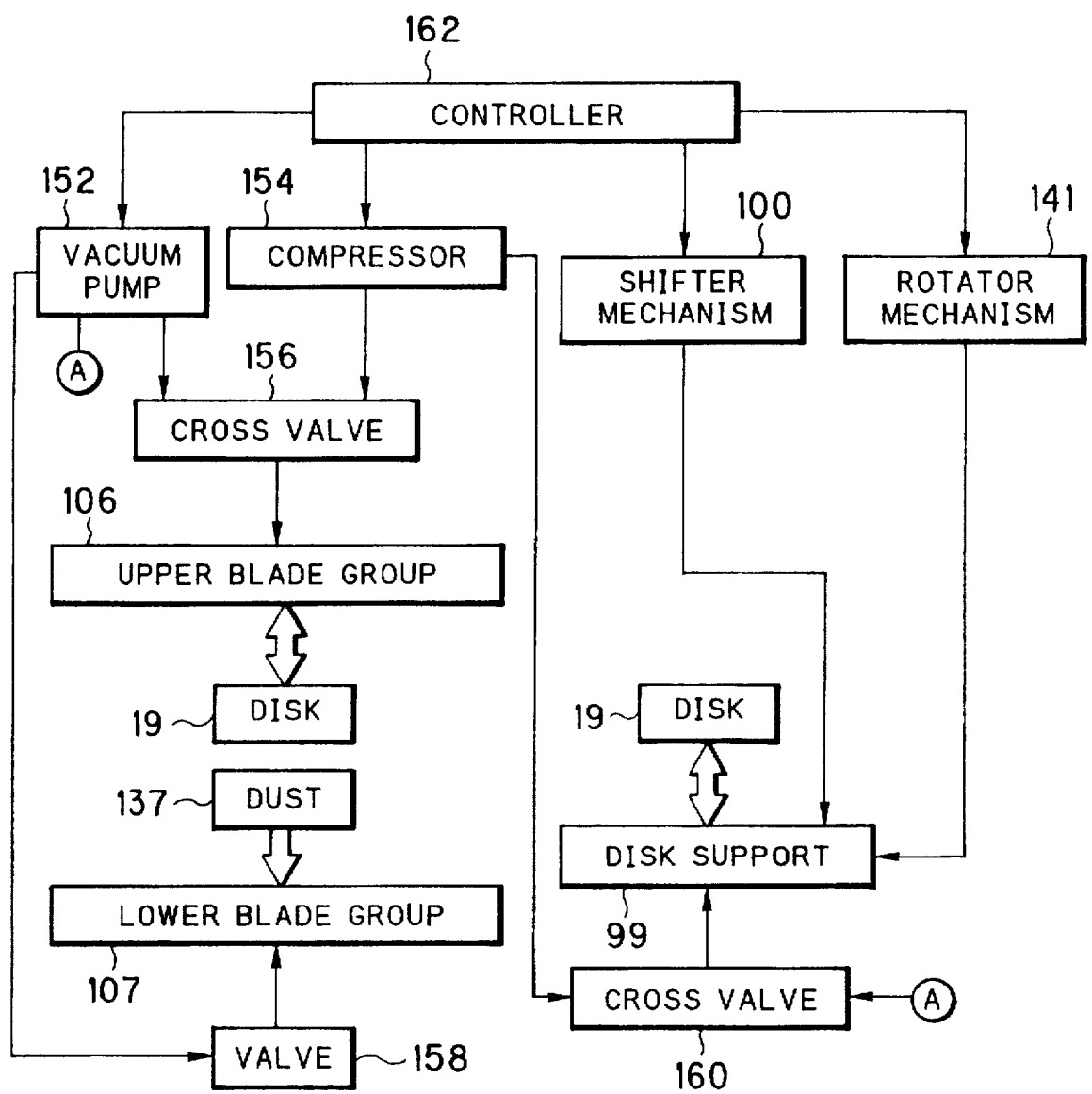
FIG. 7A is a schematic diagram illustrating construction in the disk producing apparatus for air suction and air blow.
Figure 8A:
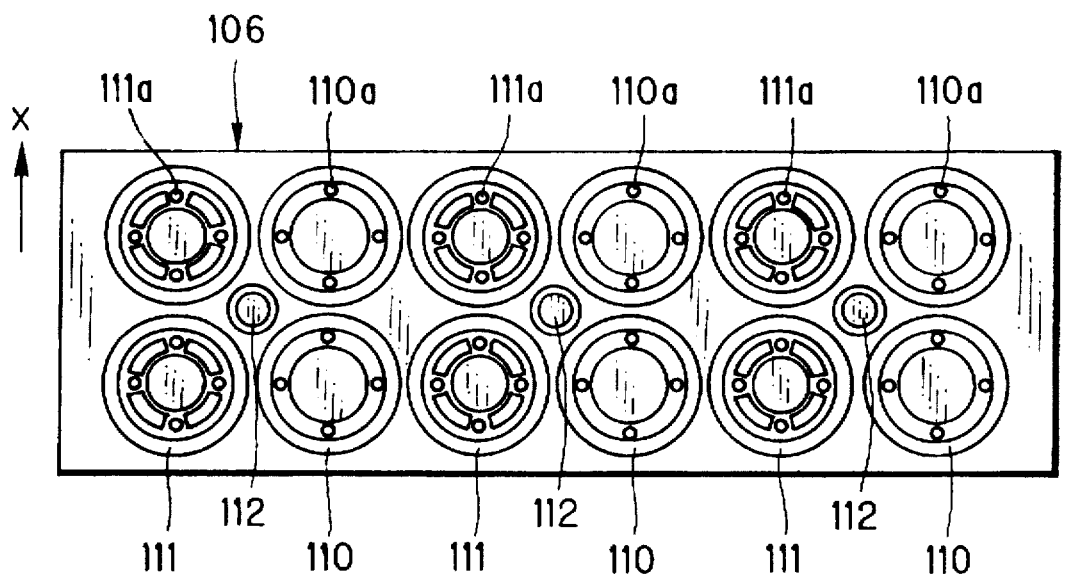
FIGS. 8A and 8B are plans respectively illustrating upper and lower blade groups.
Figure 9:
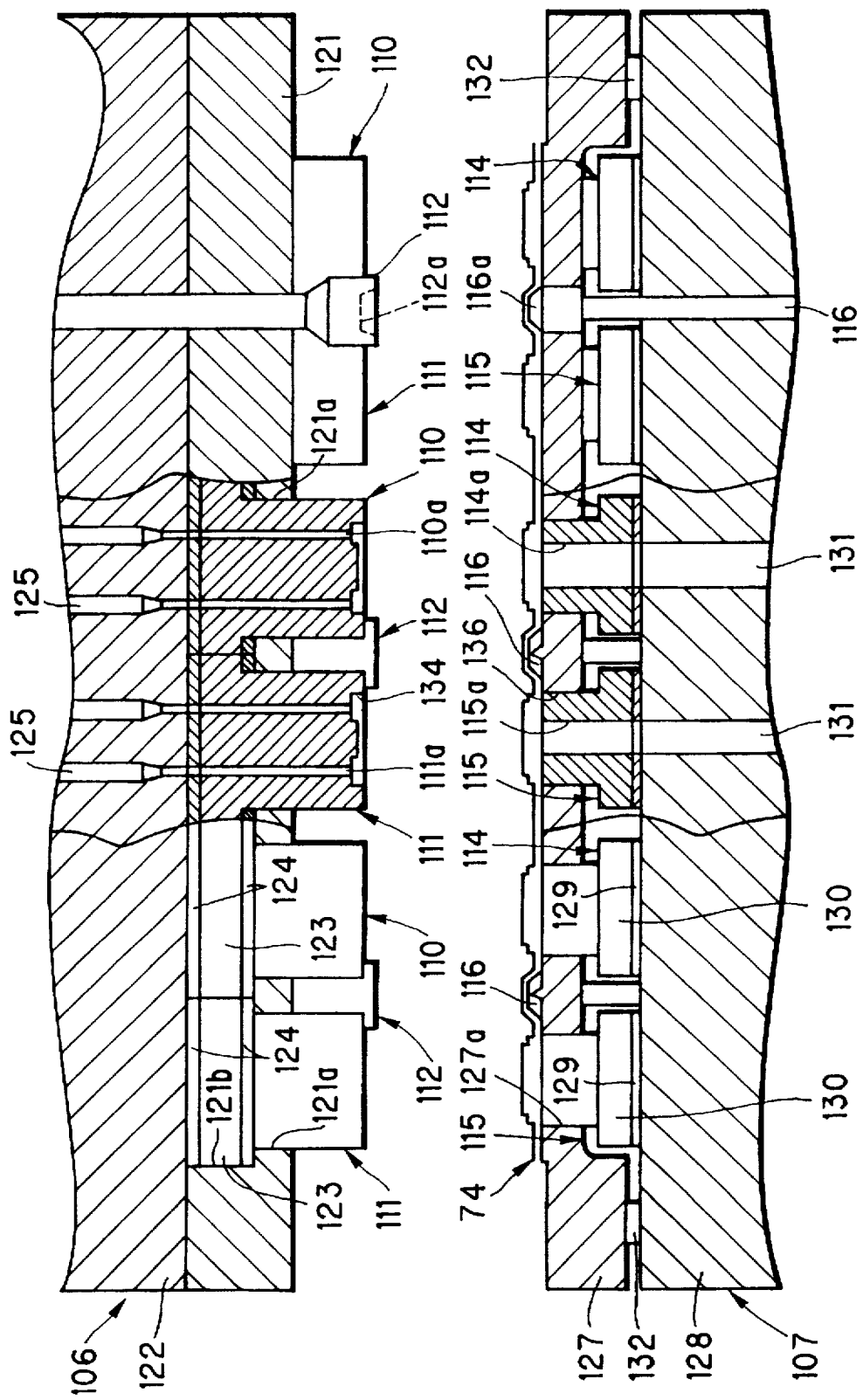
FIG. 9 is a cross section illustrating of a punching unit, taken on line transverse to a direction of conveying the sheet.

FIG. 8A illustrates a bottom of the upper blade group 106. In FIGS. 8A and 9, the upper blade group 106 includes six (6) upper blades 110 of a first type and six (6) upper blades 111 of a second type. The upper blades 110 cut the shape of the disk 19 in the disk-like portions 65. The upper blades 111 cut the shape of the disk 20 in the disk-like portions 65. There are three (3) upper positioning pins 112 arranged between first and second lines of the upper blades. Inside the upper blades 110 and 111 are formed a plurality of air passageways 110a and 111a, which are connected to a vacuum pump 152 as a disk sucker via a cross valve 156 in FIG. 7A. The vacuum pump 152 is generally controlled by a controller 162, effects suction of the disks 19 and 20 as punched from the sheet 74, and removes them therefrom.

Figure 8B:
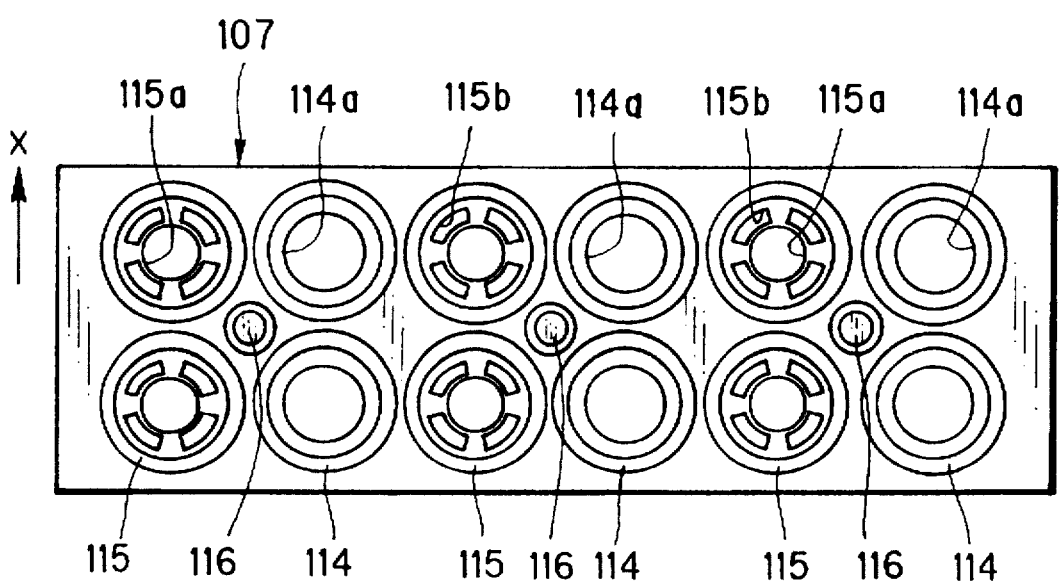

In FIGS. 8B and 9, the lower blade group 107 includes six (6) lower blades 114 of a first type and six (6) lower blades 115 of a second type, in correspondence with the upper blade group 106. The lower blades 114 cut the shape of the disk 19 in the disk-like portions 65. The lower blades 115 cut the shape of the disk 20 in the disk-like portions 65. There are three (3) lower positioning pins 116 arranged between first and second lines of the lower blades.

There are secondary cavities 114a, 115a and 115b. The secondary cavities 114a are formed in the lower blades 114 respectively to cut the axial hole 19a in the disk 19. The secondary cavities 115a are formed in the lower blades 115 respectively to cut the axial hole 20a in the disk 20. The secondary cavities 115b are formed in the lower blades 115 respectively to cut the retaining holes 25. The secondary cavities 114a, 115a and 115b are connected to an exit chute 117 of a dust sucker in a bottom of the lower blade group 107 as illustrated in FIG. 7. The dust sucker consists of the vacuum pump 152, which effects suction of punched dust via a valve 158 for ejection.

The blade groups 106 and 107 have a range to cover the width of the sheet 74. When the punching unit 86 is operated for one time, the six (6) disks 19 and the six (6) disks 20 are punched from 12 of the disk-like portions 65 inside a broken line 119 indicated in FIG. 5.

The upper blades 110 and 111 in the upper blade group 106 are individual from one another, mounted commonly between a die plate 121 and a backing plate 122, and arranged at a small interval. Tops of the upper blades 110 and 111 are mounted under bases 123, of which a diameter is greater than cylindrical portions of the dies. There are shims 124 disposed on respective tops and bottoms of the bases 123.

Openings 121a are formed in the die plate 121, and adapted to supporting punching portions of the upper blades 110 and 111 through them. Recesses 121b are formed in the die plate 121 above the openings 121a, and adapted to contain the bases 123 of the upper blades 110 and 111. The backing plate 122 is mounted on the top of the die plate 121, and keeps the upper blades 110 and 111 supported in their positions. There are plural air passageways 125 formed in the backing plate 122 and connected to the air passageways 110a and 111a. The air passageways 125 are also connected to the vacuum pump 152 and a compressor 154 controlled by the controller 162.

If the upper blades 110 and 111 of the upper blade group 106 are degraded, the upper blade group 106 is removed from the punching unit 86. The backing plate 122 and the die plate 121 are disassembled, before the upper blades 110 and 111 can be renewed.

The lower blades 114 and 115 in the lower blade group 107 are individual from one another, mounted commonly between a stripper plate 127 and a backing plate 128, and arranged at a small interval. Punch portions of the lower blades 114 and 115 are positioned through openings 127a in the stripper plate 127. Bottoms of the lower blades 114 and 115 are mounted on bases 130, of which a diameter is greater than the punches. There are shims 129 disposed on respective bottoms of the bases 130.

The stripper plate 127 is guided by shafts 132 and movable up and down. When the stripper plate 127 has a free state, the stripper plate 127 is biased by a spring and has an upwards shifted position, to cover the lower blades 114 and 115 for the purpose of facilitating conveyance of the sheet 74. When the upper blade group 106 is lowered, the stripper plate 127 is pressed by the upper blades 110 and 111 of the upper blade group 106, and sunken down to let the lower blades 114 and 115 emerge. There are plural air passageways 131 formed in the backing plate 128 and connected to the secondary cavities 114a, 115a and 115b. The air passageways 131 are adapted to connection to the vacuum pump 152, and ejection of the punched dust.

If the lower blades 114 and 115 of the lower blade group 107 are degraded, the lower blade group 107 is removed from the punching unit 86. The stripper plate 127 and the backing plate 128 are disassembled, before the lower blades 114 and 115 can be renewed.

The lower positioning pins 116 on the lower blade group 107 have respective projections 116a, which are inserted in the bottoms of the positioning portions 66 to position them. The projections 116a are located higher than the stripper plate 127, and adapted to provisional positioning of the positioning portions 66 in less precise fashion.

The upper positioning pins 112 of the upper blade group 106 have respective bottom recesses 112a for insertion of the positioning portions 66 of the sheet 74. The upper positioning pins 112 are slidable with reference to the die plate 121. When the upper positioning pins 112 have a free state, the upper positioning pins 112 are projected downwards from the die plate 121, and located slightly lower than the upper blades 110 and 111. When the upper blade group 106 is lowered, at first the positioning portions 66 are squeezed between the upper positioning pins 112 and the lower positioning pins 116 to position the sheet 74. The upper positioning pins 112 are retracted into the die plate 121 against the bias of the spring. This allows the blades 110, 111, 114 and 115 to operate properly.

Figure 10A:
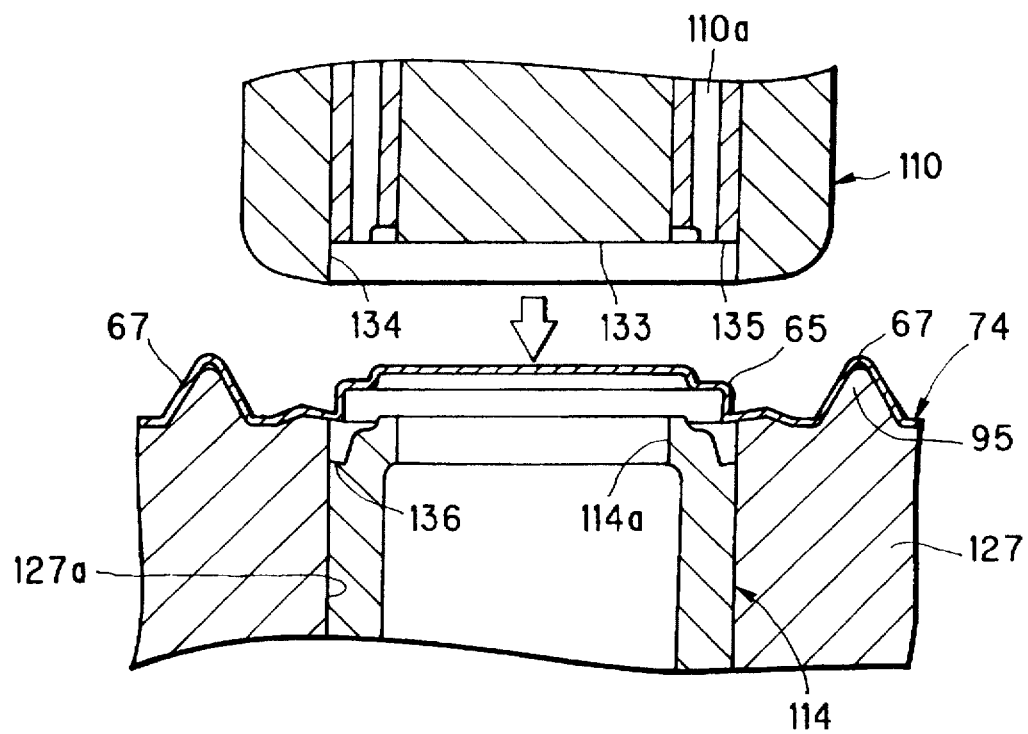
FIGS. 10A and 10B are cross sections illustrating states of the punching unit before and during the punching.
Figure 10B:
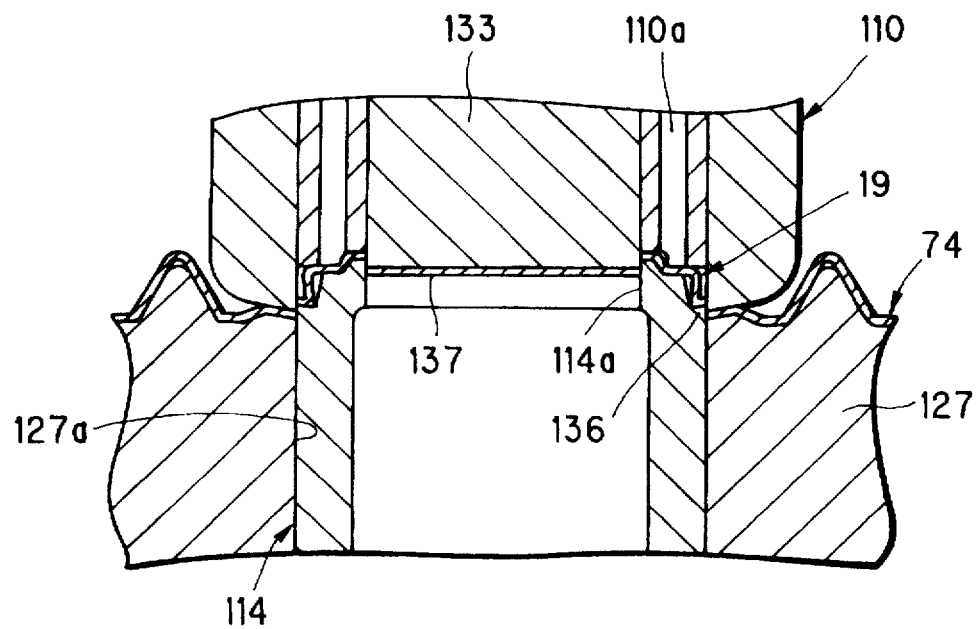

FIGS. 10A and 10B illustrate states in operation of the upper blades 110 of the upper blade group 106 and the lower blades 114 of the lower blade group 107 in combination. The centers of the upper blades 110 respectively have secondary punches 133 for punching the axial hole 19a in the centers of the disk-like portions 65. There are dies 134, arranged respectively around the secondary punches 133, for punching the contour of the disk-like portions 65. There are formed steps respectively between the secondary punches 133 and the dies 134 in a shape fitted on the top of the disk-like portions 65. Also there are knockout portions 135 respectively between the secondary punches 133 and the dies 134. The air passageways 110a are formed through the knockout portions 135 for suction of the disk 19. The dies 134 have a bottom extended lower than a bottom of the secondary punches 133. It is to be noted that the secondary punches 133, the dies 134 and the knockout portions 135 are hatched differently in the drawings for the clarification, but are actually formed integrally with one another.

The lower blades 114 have primary punches 136, each of which is disposed in combination with a primary cavity formed in each of the dies 134 of the upper blades 110. The lower blades 114 and the dies 134 punch the contour of the disk-like portions 65. Tops of the primary punches 136 have a stepped shape for receiving the disk-like portions 65. The center of the lower blades 114 has the secondary cavities 114a. The secondary cavities 114a and the secondary punches 133 punch the axial hole 19a in the disk-like portions 65.

It is important for the disks 19 and 20 to have little burr, because the disks 19 and 20 are directly contacted on the photo film 14. It is necessary to determine clearances between the secondary punches 133 and the secondary cavities 114a and between the dies 134 and the primary punches 136 in consideration of conditions where the modified polyphenylene ether (PPE) is characteristically difficult to punch, and where the manufacturing cost is increased according to shortness of punching blades. As a result of experiments, it was found that burr occurred when the clearance between the punch and the die was 20 μm or more, and that the blade had short longevity when the clearance was 1 μm or less. It is concluded that the clearances between the secondary punches 133 and the secondary cavities 114a and between the dies 134 and the primary punches 136 are 0-20 μm, preferably 2-10 μm, and desirably 3-6 μm.

When the upper blade group 106 are lowered, at first the dies 134 of the upper blades 110 are contacted on the stripper plate 127 of the lower blade group 107, to sink the stripper plate 127 against the bias of the spring. The lower blades 114 are projected over the stripper plate 127. The knockout portions 135 and the tops of the lower blades 114 squeeze the disk-like portions 65 firmly. At the same time, the secondary punches 133 and the secondary cavities 114a punch the axial hole 19a in the disk-like portions 65. The dies 134 and the primary punches 136 punch the contour of the disk-like portions 65.

Punched dust 137 created by punching the axial hole 19a is sucked through the air passageways 131 formed in the backing plate 128, and is ejected through the secondary cavities 114a. The upper blade group 106, after the punching, is raised to an initial top position. The disk 19 is sucked through the air passageways 110a on the bottom of the upper blades 110, to remove the disk 19 from the sheet 74.

The operation of the upper blades 111 and the lower blades 115 for obtaining the disk 20 is similar to that of the upper blades 110 and the lower blades 114 for the disk 19, except that the retaining holes 25 are also punched at the same time as the axial hole 20a.

As illustrated in FIG. 7, the upper blade group 106 is raised to the initial top position. The disk support 99 of the disk stacker 87 is moved into the punching unit 86. The disk receiver 97 comes to the bottom of the upper blade group 106, which drops the disks 19 and 20 to the disk receiver 97. The air suction having been effected for the disks 19 and 20 by the vacuum pump 152 is stopped, at the same time as air blow is started to the disks 19 and 20 by the compressor 154. Should the air blow be effected in a rotational direction, the disks 19 and 20 would rotate at a small amount to change the position of the drop. It is necessary to effect the air blow vertically downwards.

Figure 11A:
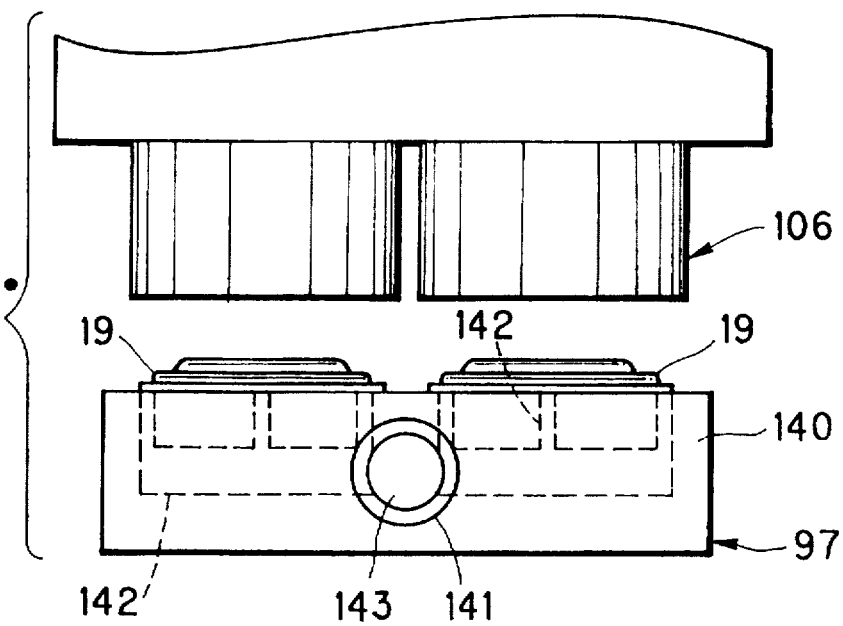
FIGS. 11A and 11B are explanatory views illustrating states of transferring the disks from the upper blade group and to a disk stacker.

The disk receiver 97, as illustrated in FIG. 11A, includes a sucking plate 140 of an auxiliary sucker and a shaft 141 of a rotator mechanism. On the sucking plate 140 are sucked the disks 19 and 20 dropped from the upper blade group 106. The shaft 141 supports the sucking plate 140 in rotatable fashion. There are plural air passageways 142 formed in the sucking plate 140. The air passageways 142 are connected to an air passageway 143 formed through the shaft 141. The air passageway 143 of the shaft 141 is connected via a cross valve 160 (See FIG. 7A) to the vacuum pump 152, which effects air suction for retention of the disks 19 and 20 dropped from the upper blade group 106. It is to be noted that the disks 19 and 20 may be electrostatically attracted and retained on the sucking plate 140 instead of the air suction. It is possible to provide the disk receiver 97 with a sensor for detecting drop of the disks 19 and 20.

After receiving the disks 19 and 20, the disk support 99 is shifted to the initial position indicated by the phantom lines in FIG. 7. The disk receiver 97 becomes located above the disk stacker 103. The disk stacker 103 consists of a plate 146 and stacker pins 145, which are erected on the plate 146, are arranged in association with the upper blades 110 and 111, and have thickness suitable for receiving the axial holes 19a and 20a.

Figure 11B:
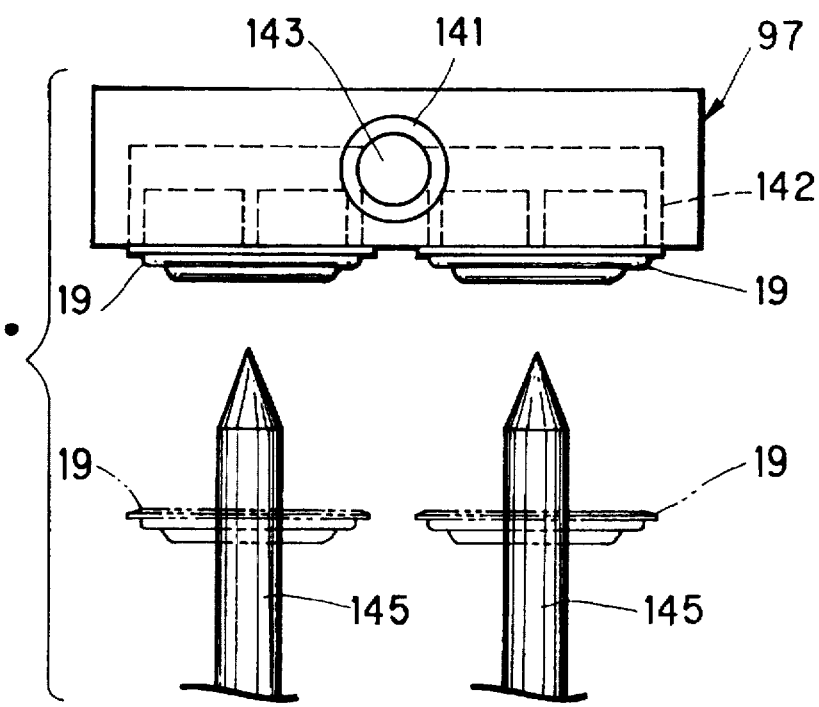

The disk receiver 97 makes half a rotation about the shaft 141 as illustrated in FIG. 11B while the disk support 99 moves to the initial position. A face of the disk receiver 97 for suction of the disks 19 and 20 is directed downwards. The air blow is effected through the air passageways 142 and 143, to drop the disks 19 and 20 to the stacker pins 145, which are inserted in the axial holes 19a and 20a in the disks 19 and 20, for stacking of the disks 19 and 20 in alignment.

When the disks 19 and 20 of the predetermined number are stacked in the disk stacker 103, the disk stacker 103 is conveyed by the stacker conveyor 104 to the right in FIG. 7, and to next station of the disk mounting on spool cores. Then a new disk stacker 103 is supplied to a bottom of the disk receiver 97.

The sheet 74 of which all the disk-like portions 65 are punched is dropped from the end of the guide plate 94, and transferred to the sheet remover 88 along a guide plate 148. The sheet remover 88 has a dust conveyor 149, which conveys the sheet 74 to the left as viewed in FIG. 7, and stacks the sheet 74 in a discarding container 150. Also the punched dust 137 is dropped on the dust conveyor 149, and transferred into the discarding container 150. The sheet 74 and the punched dust 137 stacked in the discarding container 150 are recycled by operation of cutting and remelting.

Figure 12:
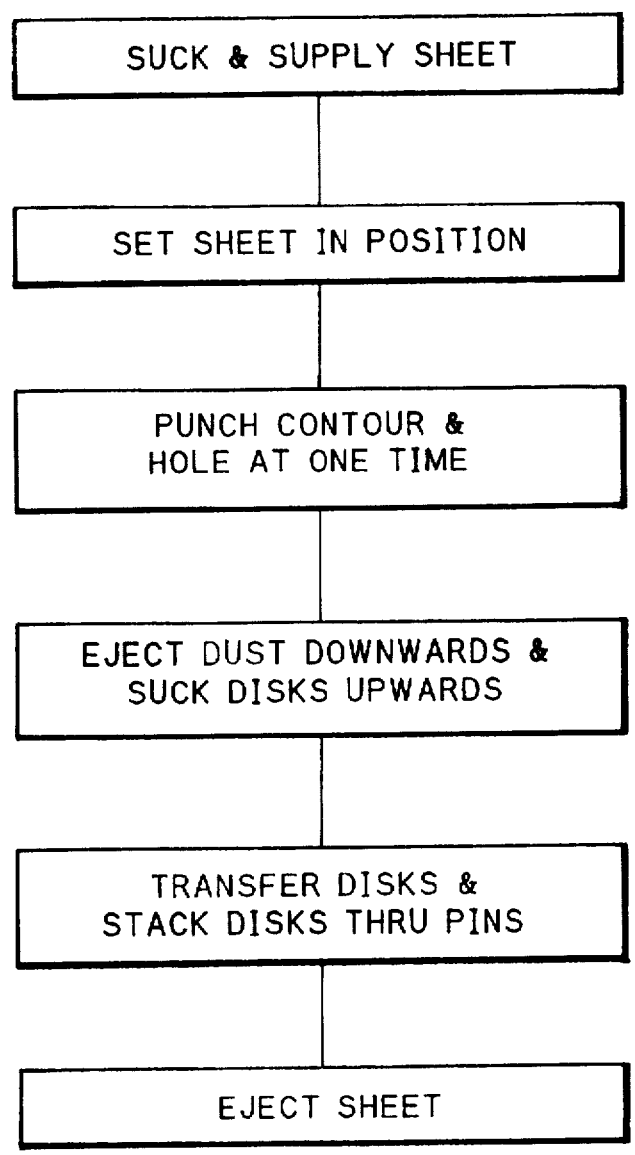
FIG. 12 is a flow chart illustrating an order of producing the disks.

Operation of the above embodiment is described now by referring to FIG. 12. The sheets 74, on which the disk-like portions 65, the positioning portions 66, the guide ridges 67 and the reinforcer ridges 68 are formed, are stacked in the sheet stacking container 76 on one another, and fed to the bottom of the sheet supply device 85 in FIG. 7. In the sheet 74, the disk-like portions 65 are arranged at such a small interval that a proportion of the number of disks to an amount of the material is raised.

The sheet supply device 85 causes the air cylinder in the sheet conveyor 91 to lower the sheet sucker 90, to suck the uppermost one of the sheets 74 according to the air suction. Again the sheet sucker 90 with the sheet 74 is raised by the air cylinder. The sheet conveyor 91 is slid along the guide rail 92, to move the sheet sucker 90 to the guide plate 94, to which the sheet 74 is supplied. The supply of the sheet 74 is consecutive in association with the operation of the punching unit 86. In the sheet stacking container 76, the bottom plate 77 is raised in accordance with remaining ones of the sheets 74, to keep the uppermost one of the sheets 74 in an unchanged level. When the sheets 74 in the sheet stacking container 76 decrease to zero, a new sheet stacking container 76 with new sheets 74 is supplied. Thus the sheets 74 are supplied without interruption. The efficiency in manufacturing the disks 19 and 20 can be raised because the sheet 74 in the sheet stacking container 76 is fed to the guide plate 94 in fully automated fashion.

In the sheet 74 placed on the guide plate 94, the guide ridges 95 (See FIG. 10) are inserted in the rear of the guide ridges 67 to position the sheet 74 in the width direction. The sheet 74 is intermittently conveyed to the right along the guide ridges 95. This reduces deviation in position relative to the width direction even through the sheet 74 has the small length. To convey the sheet 74, the disk support 99 of the disk stacker 87 is moved by the disk conveyor 98 into the punching unit 86. The retainer 101 is lowered to retain the outside of the positioning portions 66. Then the disk support 99 is moved by the disk conveyor 98 back to the initial position. The sheet 74 is conveyed as much as the pitch of the positioning portions 66. It is accordingly possible to keep unchanged a conveying amount of the sheet 74.

The sheet 74 conveyed on the guide plate 94 comes to the punching unit 86. First three (3) of the positioning portions 66 relative to the direction X are fitted on the projections 116a of the lower positioning pins 116 of FIG. 9. 12 of the disk-like portions 65, surrounding the three (3) of the positioning portions 66, are placed on the stripper plate 127 of the lower blade group 107.

When the upper blade group 106 is lowered by the drive unit 108, at first the upper positioning pins 112 on the upper blade group 106 come to the sheet 74, to retain the tops of the positioning portions 66 in the bottom recesses 112a. The lower positioning pins 116 are pressed on the bottoms of the positioning portions 66. The sheet 74 is positioned in orientation suitable for the punching. The upper positioning pins 112 are slid to the upper blade group 106 against the bias of the spring, and do not hinder operation of the punching. The positioning portions 66 are squeezed vertically and positioned, so that precision in positioning the sheet 74 is raised. The difference in the positioning between the vacuum/air-pressure forming and the punching is reduced, to increase precision in manufacturing the disks.

The upper blade group 106 is further lowered. As illustrated in FIG. 10B, the upper blades 110 and 111 are contacted on the stripper plate 127, which is sunken against the bias of the spring while guided by the shafts 132. The lower blades 114 and 115 of the lower blade group 107 are projected over the stripper plate 127. At the upper blades 110, the knockout portions 135 and the lower blades 114 squeeze the disk-like portions 65. At the same time, the secondary punches 133 and the secondary cavities 114a punch the axial hole 19a in the disk-like portions 65. The dies 134 and the primary punches 136 punch the contour of the disk-like portions 65.

The blade groups 106 and 107 are a type of inserts. The blades 110, 111, 114 and 115 are arranged at such a small interval that a proportion of the number of the disk-like portions 65 to an amount of the material is raised. If any blade is degraded, the blades 110, 111, 114 and 115 can be renewed respectively in an individual manner, so that the cost for maintenance can be reduced. As the blades 110, 111, 114 and 115 are mounted on the die plate 121, the backing plate 122, the stripper plate 127 and the backing plate 128, the rigidity of the blade groups 106 and 107 is raised to raise the precision in the punching is raised.

As illustrated in FIG. 7, the vacuum pump 152 connected to the exit chute 117 in the lower blade group 107 effects air suction during the punching, to eject the punched dust 137 through the air passageways 131 and the secondary cavities 114a, 115a and 115b. The punched dust 137 ejected through 117 is placed on the dust conveyor 149, and transferred into the discarding container 150. It is possible to avoid depositing the dust on the blades, because the dust ejection is simultaneous with the punching. Disks next to punch can be protected from the dust.

When the punching unit 86 finishes punching the sheet 74, the upper blade group 106 is raised by the drive unit 108 toward the initial top position. The air suction is effected through the upper blade group 106 by the vacuum pump 152. The disks 19 and 20 are sucked on the bottom of the upper blade group 106 through the air passageways 125 in the backing plate 122 and through the air passageways 110a and 111a, and removed from the sheet 74. This suction of the disks 19 and 20 through the upper blade group 106 is advantageous in facilitating removal of the disks 19 and 20.

When the upper blade group 106 moves back to the initial top position and the disks 19 and 20 are removed from the sheet 74, then the disk support 99 of the disk stacker 87 is driven by the shifter mechanism 100, and moved to the punching unit 86. The disk support 99 lowers the retainer 101 to retain the tops of the positioning portions 66 of the sheet 74, to stand by for next operation of conveying the sheet 74. As illustrated in FIG. 11A, the disk receiver 97 is located directly under the upper blade group 106.

When the disk receiver 97 lies under the upper blade group 106, the air suction through the air passageways 110a and 111a for the disks 19 and 20 by the vacuum pump 152 is stopped, at the same time as the air blow is started to the disks 19 and 20 by the compressor 154. The disks 19 and 20 are dropped on the sucking plate 140, on which, in turn, the disks 19 and 20 are sucked through the air passageways 142 and 143. The use of the air suction for transferring the disks is advantageous in reducing degradation of the disks 19 and 20.

After the disks 19 and 20 are transferred by the upper blade group 106 and the disk receiver 97, the disk support 99 of the disk stacker 87 is driven by the shifter mechanism 100 and moved to the right initial position in FIG. 7. The sheet 74 is conveyed as much as the pitch of the intermittent conveyance. Next three (3) of the positioning portions 66 with reference to the direction X of the sheet 74 in FIG. 5 are received in the projections 116a on the lower positioning pins 116. In the meantime, the disk receiver 97 makes half a rotation about the shaft 141.

When the disk support 99 is moved to the initial position, the disk receiver 97 is located directly above the disk stacker 103 in FIG. 11B. The disk receiver 97 is oriented to direct the disks 19 and 20 downwards. In the disk receiver 97, the air suction effected for the disks 19 and 20 by the vacuum pump 152 is stopped, at the same time as the air blow is started to the disks 19 and 20 by the compressor 154. The disks 19 and 20 are dropped, and received by the stacker pins 145 in insertion through the axial holes 19a and 20a. The disk stacker 103 where the disks 19 and 20 are stacked up to a predetermined number is conveyed by the stacker conveyor 104 to next station where the disks 19 and 20 are mounted on the spool core 13. The disks 19 and 20 being stacked in alignment, it is easy in next station to take out the disks 19 and 20, to raise efficiency in manufacturing the cassette.

The sheet 74 is punched for further five (5) times. The disks 19 and 20 are repeatedly transferred and stacked. The sheet 74 of which all the disk-like portions 65 are punched is dropped from the end of the guide plate 94 along the guide plate 148, and placed on the dust conveyor 149. The dust conveyor 149 stacks the sheet 74 in the discarding container 150. The disks 19 and 20 are obtained in mass production by repetition of the above operation.

In the above embodiment, the 12 disks 19, 20 are punched at one time. The present invention is applicable to construction for punching 6 disks in one line, 18 disks in three lines, or any other number of disks, at one time. In the above embodiment the disks 19 and 20 are punched at the same time. The present invention is applicable to the use of two separate lines, one for punching the disk 19 and another for punching the disk 20.

The above-described embodiment is based on the method of sheet forming, in which a thermoplastic synthetic resin sheet is used for forming disks. The forming is basically the vacuum/air-pressure forming in which compressed air is auxiliary used. The present invention is applicable to disk production in which simple vacuum forming is effected without compressed air. In the present invention, the female mold 58 is used. Should a male mold be used instead, its surface would form an inner face of the disk to contact on the photo film. The male mold would be likely to give a mold mark on the inner face by way of unwanted roughness scratching or influencing the photo film. Thus the use of the female mold 58 is advantageous.

In the present invention, structures other than the above-described photo film cassette may be used. Typical examples usable in the present invention are hereinafter referred to. Of course the present invention is not limited to those examples, but can be combined with any known construction.

The following techniques are used for producing the photo film 14 with a magnetic recording layer: JP-A 6-35118 and 6-17528 and *Bulletin of Disclosed Techniques of the Association of Invention* (*Hatsumei Kyokai Kokai Giho*) 94-6023 disclose a thermally pretreated thin polyester support, for example, a polyethylene aromatic dicarboxylate type of polyester support as a support of the photo film 14. The polyester support is 50–300 µm thick, preferably 50–200 µm thick, more preferably 80–115 µm thick, and desirably 85–105 µm thick, and is thermally treated or "annealed" for 1–1500 hours under a temperature lower than a glass transition temperature of the polyester support. According to JP-B 43-2603, 43-2604 and 45-3828, ultraviolet rays are applied to the polyester support for the surface treatment. According to JP-B 48-5043 and JP-A 51-131576, surfaces of the polyester support is treated by effecting corona discharge. According to JP-B 35-7578 and 46-43480, the surfaces of the polyester support is treated by effecting glow discharge. According to U.S. Pat. No. 5,326, 689, an undercoat is applied to the polyester support. If necessary, an undercoat according to U.S. Pat. No. 2,761, 791 is applied to the polyester support. According to JP-A 59-23505, 4-195726 and 6-59357, a coating of particles of strong magnetic material is applied to the polyester support.

As disclosed in JP-A 4-124642 and 4-124645, a layer of the magnetic material may be arranged like stripes. According to JP-A 4-62543, the polyester support is treated for an antistatic characteristic if desired. Finally a coating of silver halide emulsion is applied thereto. JP-A 4-166932, 3-41436 and 3-41437 disclose examples of the silver halide emulsion.

A production managing method of JP-B 4-86817 for photo sensitive material can be preferably used in the production. A data recording method of JP-B 6-87146 can be used for recording the manufacture data. A photo film producing method of JP-A 4-125560 is preferable in a step before or after the production managing step. The film material is cut into the photo film strip with a width smaller than that of the 135 size. Perforations along one of edges are formed so that two of them are associated with each of frames, of which a format is smaller than a frame of a full size of the 135 type.

The strip of the photo film as produced is contained in a cassette, cartridge, patrone or the like to be used: the cartridge package disclosed in JP-A 4-157459; the cartridge depicted in FIG. 9 of JP-A 5-210202 (corresponding to U.S. Pat. No. 5,363,166); and the cassette of U.S. Pat. Nos. 4,221,479, 4,834,306, 5,226,613 and 4,846,418.

The structures of U.S. Pat. Nos. 4,848,693 and 5,317,355 are favorable as cassette in which the leader is pre-contained, in view of light-shielding performance. U.S. Pat. No. 5,296,886 discloses a lock mechanism preferably usable with the cassette. U.S. Pat. No. 5,347,334 discloses an indication preferably to display a degree of use of the photo film in the cassette. The structure of EP-A 0 582 852 (corresponding to JP-A 6-35123) may be used, in which photo film can be readily loaded in a cassette as soon as the photo film is simply inserted into the cassette.

The photo film cassette can be used for numerous purposes of photography, development and various manners of using photographs, by means of a camera, a photo film processor, and other optical instruments of a photo laboratory. As examples, JP-A 6-8886 and 6-99908 disclose cameras of simple loading types. JP-A 6-57398 and 6-101135 disclose cameras of automatic photo film winding types. JP-A 6-205690 discloses a camera in which the photo film can be removed during operation of using the photo film for a number of exposures. JP-A 5-293138 and 5-283382 disclose magnetic information recording cameras of a printing aspect ratio selectable type, namely a camera in which information of panoramic photography, wide-vision size photography or normal size photography can be magnetically recorded to photo film. JP-A 6-101194 discloses a camera capable of avoiding double exposures. JP-A 5-150577 discloses a camera capable of externally indicating a used status of photo film.

The photo film after taking exposures is developed by one of automatic photo film processors JP-A 6-222514 and 6-222545. JP-A 6-95265 and 4-123054 disclose methods of magnetic recording on photo film, which methods can be utilized before or after the development. Selection of an aspect ratio according to JP-A 5-19364 can be also used. If the photo film processor is a motion picture photo film type, the method disclosed in JP-A 5-119461 is used for splicing the photo film. When or after the photo film is developed, the photo film is attached or detached according to JP-A 6-148805.

After the photo film processing, the methods of JP-A 2-184835, 4-186335 and 6-79968 may be used for conversion of the photo film information to a printable form to a front face or a back face of color paper. The methods of JP-A 5-11353 and 5-232594 may be used for returning the photo film to a customer with an index print or a returning cartridge.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A disk producing apparatus for a photo film cassette, said photo film cassette comprising: a spool core on which photo film is wound in a form of a roll; and a disk, in which an axial hole is formed, which is secured to each end of said spool core, for regulating ends of said roll of said photo film in said cassette, said disk producing apparatus comprising:

a sheet supply device for supplying to a positioning device a sheet of thermoplastic synthetic resin, there being plural disk-shaped portions and a positioning portion formed on said sheet;

said positioning device fitted on said positioning portion of said sheet supplied from said sheet supply device, for positioning said sheet;

an upper blade group, disposed above said sheet and including N upper blades, where N is an integer;

a lower blade group, disposed below said sheet and including N lower blades, said upper and lower blade groups squeezing N of said disk-shaped portions while said sheet is positioned by said positioning device, for punching said axial hole and a contour of said disk, to obtain N disks;

a disk sucker, disposed with said upper blade group, for sucking said N disks on said upper blade group, to remove said N disks from said sheet;

a dust sucker, disposed with said lower blade group, for sucking dust punched from said axial hole in said N disks through said lower blade group, to eject said punched dust;

a disk stacker for stacking said N disks from said upper blade group; and a sheet remover for exiting said sheet after punching plural disks which comprise said N disks.

2. A disk producing apparatus as defined in claim 1, wherein said sheet supply device includes:

a sheet sucker for sucking an uppermost one of plural stacked sheets; and a sheet conveyor for supporting said sheet sucker in a movable fashion, and for conveying said uppermost sheet being sucked between said upper and lower blade groups.

3. A disk producing apparatus as defined in claim 2, further comprising:

a cutter device for cutting a portion of web having said plural disk-shaped portions formed thereon into said sheet; and a sheet stacker, disposed under said cutter device, for receiving said sheet dropped from said cutter device, another sheet being dropped from said cutter device on said sheet, said sheet stacker stacking said plural stacked sheets of which said sheet device accesses said uppermost one.

4. A disk producing apparatus as defined in claim 3, further comprising:

a web supplier for supplying said web of said thermoplastic synthetic resin from a web roll;

a web conveyor for conveying said web intermittently from said web supplier; and a vacuum/air-pressure forming unit for forming said plural disk-shaped portions in accordance with vacuum/air-pressure forming while said web being conveyed is stopped, subsequently said web being conveyed by said web conveyor to said cutter device.

5. A disk producing apparatus as defined in claim 1, further comprising:

an upper support for supporting said upper blade group and rendering said upper blades movable together; and a lower support for supporting said lower blade group and rendering said lower blades movable together.

6. A disk producing apparatus as defined in claim 1, wherein said sheet has said plural disk-shaped portions arranged in a matrix of K lines as viewed in a conveying direction of said sheet and L lines as viewed in a transverse direction of said sheet, N being an integer multiple of L, said upper blades are arranged in said L lines as viewed in said transverse direction, said lower blades are arranged in said L lines as viewed in said transverse direction, and said upper and lower blades punch said disk-shaped portions of said L lines at a same time.

7. A disk producing apparatus as defined in claim 1, further comprising:

a disk conveyor for conveying said N disks from said upper blade group to said disk stacker;

said disk stacker including N stacker pins respectively for receiving said axial hole of said N disks, to stack said N disks.

8. A disk producing apparatus as defined in claim 7, wherein a combination of one of said upper blades and one of said lower blades includes:

a die, having a primary cavity formed therein;

a primary punch, received by said primary cavity, for punching said contour of said disk;

a secondary cavity, formed substantially in a center of said primary punch; and a secondary punch, disposed in said primary cavity, received in said secondary cavity when said primary cavity receives said primary punch, for punching said axial hole in said disk.

9. A disk producing apparatus as defined in claim 8, wherein a first type of said disk is punched from a first line of said upper and lower blades, and a second type of said disk is punched from a second line of said upper and lower blades and next to said first line.

10. A disk producing apparatus as defined in claim 9, wherein said upper blades have said die and said secondary punch, and said lower blades have said primary punch.

11. A disk producing apparatus as defined in claim 8, wherein said N disks are removed by said disk sucker, and then said disk sucker is stopped from sucking, to drop said N disks from said upper blade group.

12. A disk producing apparatus as defined in claim 11, wherein said disk conveyor includes:

a disk support, movable between said upper disk group and said disk stacker, for receiving said N disks dropped from said upper blade group;

a shifter mechanism for shifting said disk support from said upper blade group to a top of said disk stacker; and a rotator mechanism for rotating said disk support upside down above said disk stacker.

13. A disk producing apparatus as defined in claim 12, further comprising an air blower, disposed with said disk sucker and with said upper blade group, for blowing air downwards from said upper blade group, when said disk sucker is stopped, to drop said N disks forcibly toward said disk support.

14. A disk producing apparatus as defined in claim 13, wherein said disk conveyor further comprises:

an auxiliary sucker, disposed with said disk support, for sucking said N disks received on said disk support; and an auxiliary air blower, disposed with said disk support, for blowing air downwards from said disk support rotated upside down, to drop said N disks forcibly toward said disk stacker.

15. A disk producing apparatus as defined in claim 8, wherein a clearance between said primary cavity and said primary punch and a clearance between said secondary cavity and said secondary punch are between 0–20 μm.

16. A disk producing apparatus as defined in claim 8, wherein a clearance between said primary cavity and said primary punch and a clearance between said secondary cavity and said secondary punch are between 2–10 μm.

17. A disk producing apparatus as defined in claim 8, wherein a clearance between said primary cavity and said primary punch and a clearance between said secondary cavity and said secondary punch are between 3–6 μm.

18. A disk producing apparatus as defined in claim 1, wherein said positioning portion of said sheet includes circular portions having an upset cup shape and an inclined face, and wherein said positioning device includes positioning pins having inclined surfaces which engage said circular portions.

19. A disk producing apparatus as defined in claim 1, wherein said positioning portion of said sheet includes parallel guide ridges having an upset V-shape, wherein said positioning device includes guide ridges having inclined surfaces which engage said parallel guide ridges.

* * * * *